Nov. 15, 1966   C. LANDY   3,285,434
CLASSIFYING SYSTEM
Filed Oct. 28, 1965   5 Sheets-Sheet 1
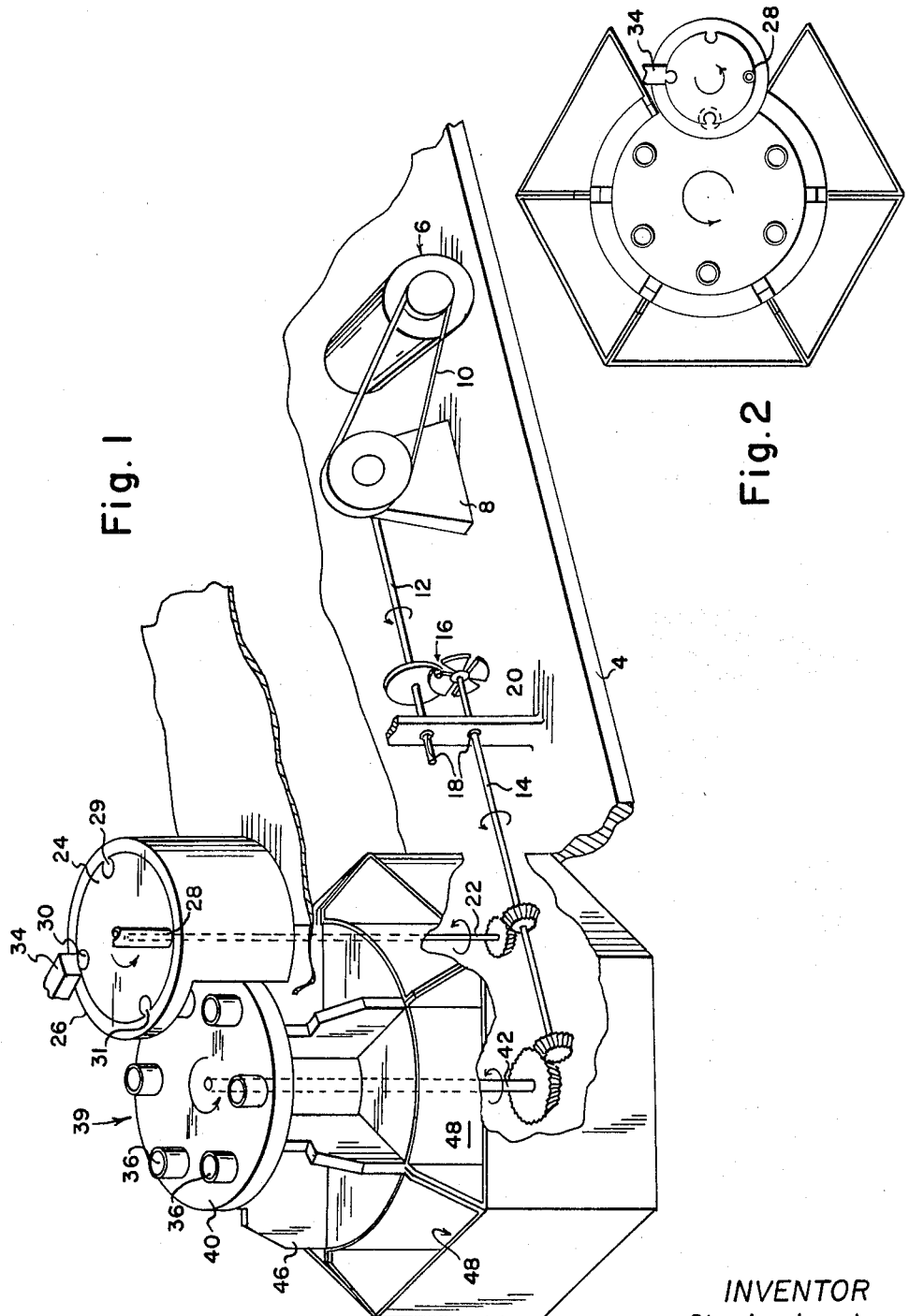
INVENTOR
Charles Landy
BY
Curtis, Morris & Safford
ATTORNEYS INVENTOR
Charles Landy
BY
Curtis, Morris & Safford
ATTORNEYS INVENTOR
Charles Landy
BY
Curtis, Morris & Safford
ATTORNEYS Nov. 15, 1966     C. LANDY     3,285,434

CLASSIFYING SYSTEM

Filed Oct. 28, 1965     5 Sheets-Sheet 5

INVENTOR
Charles Landy
BY
*Curtis, Morris & Safford*
ATTORNEYS 3,285,434
CLASSIFYING SYSTEM
Charles Landy, 17 Ave. du Colonel Bonnet,
Paris, France
Filed Oct. 28, 1965, Ser. No. 505,498
Claims priority, application France, Sept. 7, 1962,
908,826, Patent 1,340,320
19 Claims. (Cl. 214—11)

This application is a continuation-in-part of my co-pending application Serial No. 307,228, filed September 6, 1963, now abandoned. The present invention relates to moving mechanical memory devices of the kind employed for sorting or classifying mechanical or electrical articles and components by one of their characteristics.

In the classification of mechanical or electrical components in accordance with one of their characteristics—for example, the diameter of a bearing roller—the number of classes required may be considerable and the overall size of the components may be large, so that the transfer of the classified component to the compartment which is to receive it is slow and retards the rate of classification, the distance to be travelled increasing in proportion to the number of the class and the size of the component.

In order to increase the speed of classification, memory devices are employed which register the classification number at the measuring station and which fix, by means of more or less complicated mechanical or electro-mechanical devices, the place at which the component is subsequently to be deposited. Electronic devices are often utilized for this purpose. They have however the disadvantage that they store only very little data, while on the other hand they do not free themselves of all their data in the event of failure of the power supply.

Classification systems with moving mechanical memory devices have not found any general use in industry up to the present time, mainly because of their inherent complexity.

As a general rule, a memory system required to give N information items comprises N moving elements, each occupying two positions and actuating a separate device which effects the distribution of the object to be transferred to a desired position; this means that there are N+1 moving elements.

In the purely mechanical system of the present invention, a single memory element having two degrees of freedom of movement (sliding and rotation) is sufficient to insure the registration and retention in the memory system of N information items and their subsequent utilization, i.e. to control distribution of products or components. This novel step results in great simplicity and economy and opens up the possibility of many new applications in industry.

A further advantage of the moving mechanical memory devices of the invention is that they are accurate and faithfull without limit of time, while the energy required for the actuation of the release of the articles at the selected station is obtained without relying upon the movement which displaces the memory devices or memories, this making it possible to dispense with electric, electronic or pneumatic relays, and further simplifying the system.

The present invention has for its object the provision of a moving mechanical device which has two degrees of freedom of movement, one of these movements being employed for registering the code or class number of each object or component, while the other movement is intended, for example, to release the object at the appropriate position or station. As the energy required for registration is very small, the actuating power of the device which frees the component can be relatively very great.

A moving mechanical classifying device illustrative of and according to the invention is characterized by the fact that it comprises a plurality of memory units or devices mounted on a step-by-step indexing device, each unit possessing two degrees of freedom of movement, namely: a longitudinal sliding movement of a circular-tooth rack permitting the registration of an order-value; and a rotational movement of the shaft carrying the said toothed rack station predetermined by the said order-value. at a specific station predetermined by the said order-value.

In accordance with a first illustrative embodiment, the whole series of memory units is mounted on a turret which advances by one step after the arrival of each of the components or objects to be sorted or classified, and the registration of its order value in the memory device, the said component or object being received in a cup-like housing closed at its bottom by a moving slide shutter rigidly fixed to a shaft which is mounted for rotation thereby to open and close the bottom of the housing. Slidably upon the shaft is the rack which is circular-toothed and is keyed to the shaft.

The registration of the order-value is effected by raising the rack through a distance corresponding to the height of N teeth. From the beginning of the step-by-step movement of the turret, the lowermost of said N teeth of the rack is engaged in a stationary helicoidal ramp which causes the rack to move downwards by the height of one tooth for each step forward of the turret, i.e., the step-by-step device. During the Nth step, the toothed rack is at its bottom position, and during the next step a finger fixed on the rack comes into contact with a fixed stud which causes rotation of the rack during this last step. The rotation of the rack is transmitted through the key to the shaft with a consequent opening of the shutter and the release of the component or object. A second finger rigidly fixed to the rack, subsequently comes into contact with a stationary abutment and turns the shaft and the rack back into the initial angular position corresponding to the closed position of the shutter, by coming into contact with an internal abutment.

According to a second embodiment of the invention, use is made of the mechanical contact between the finger on the rack and the fixed stud to establish an electric contact which actuates the ejection of the component by means of a servo-mechanism. Prior to such ejection, the component is supported upon a separate transfer device, the movement of which is synchronized with the movements of the memory unit.

When a classification is to be carried out by the use of several characteristics or when the number of classes is large, a number of memory units can be coupled together, each of these units determining the number of steps to be effected from the station of origin up to each change of transfer.

The method and means for accomplishing the step-by-step displacement of a group of memory units may be varied greatly without departing from the scope of the present invention. In the case where the number of memory units is large, an endless chain is to be preferred as the transfer means in order to reduce the overall size of the device.

The invention will be more readily understood from the description which follows below of certain of its preferred embodiments, given by way of example only and not in any limiting sense, reference being made to the accompanying drawings, in which:

FIGURE 1 is a perspective view, with portions cut away, of one embodiment of the invention;

FIGURE 2 is a diagrammatic plan view of the device shown in FIGURE 1;

Figure 3:
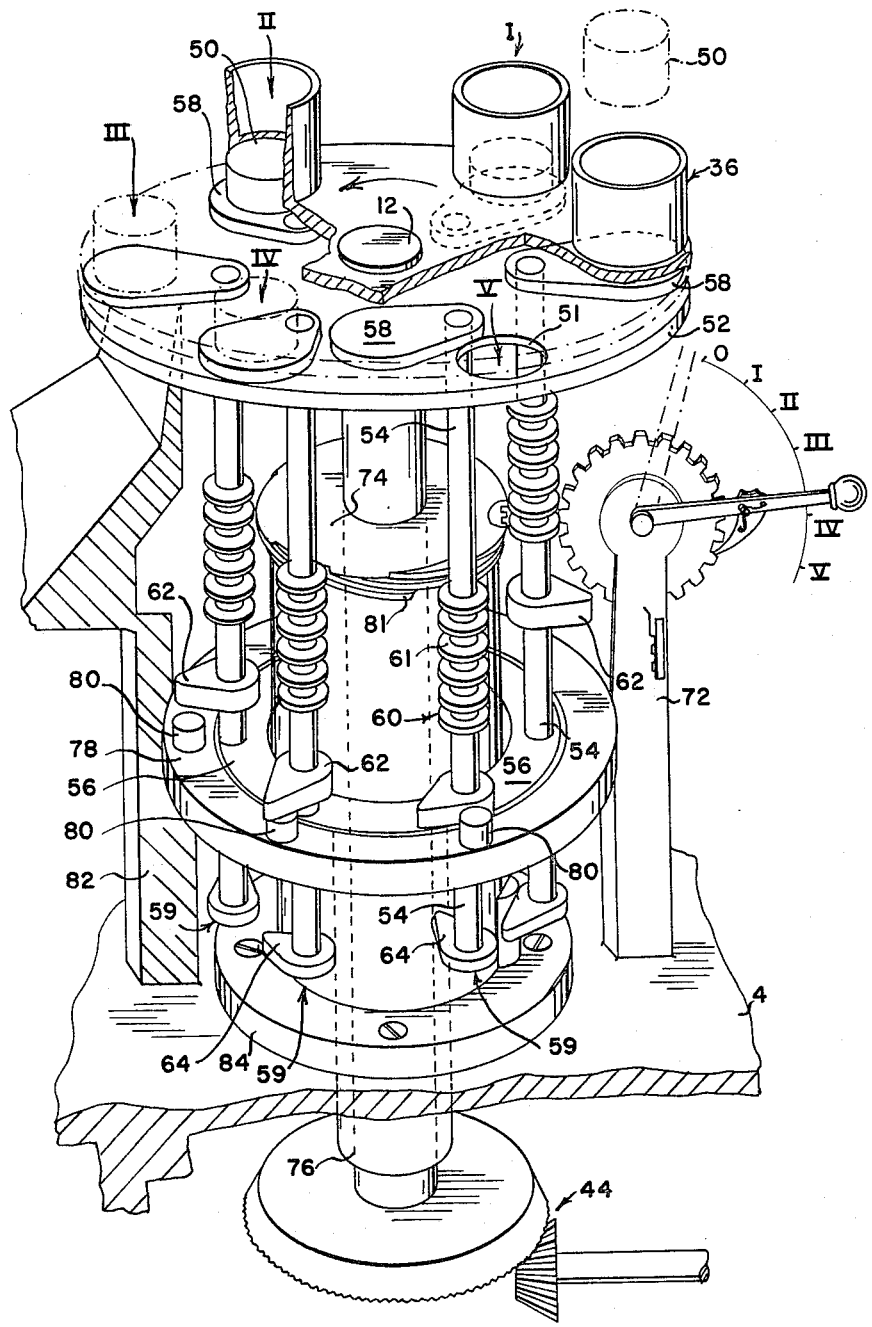
FIGURE 3 is a diagrammatic perspective view of the turret portion of the device shown in FIGURES 1 and 2.

Referring to FIGURE 1, a sorting device 2 includes a base 4 and a number of other structural members rigidly mounted upon base 4 to form a frame structure. Also mounted upon base 4 is a motor drive unit formed by an electric motor 6 and a gear reduction unit 8 which is driven by motor 6 through a driving belt 10. Gear unit 8 is connected to a shaft 12, which it rotates in the direction shown by the arrow. Shaft 12 drives a second shaft 14 in a step-by-step manner through a Maltese cross drive 16, which cause shaft 14 to rotate at regular time intervals and at a regular rate. Shafts 12 and 14 are supported by a plurality of bearing 18, mounted in a vertical frame member 20. Shaft 14 is connected to a vertical drive shaft 22, which in turn turns a circular metal plate 24, rotatably mounted in a shallow cylindrical depression in the top of frame member 26, which forms part of the top of the sorting device. Secured equidistantly around the periphery of plate 24 are four cylindrical holes 28, 29, 30 and 31.

The objects or components to be sorted enter the sorting device through a vertical tube 34, arriving at such times that one object is deposited in each of holes 28, 29, 30 or 31, as plate 24 rotates and the holes pass beneath the end of tube 34. The rotation of plate 24 carries each of the objects successively to the positions of holes 29, 30 and 31 in FIGURE 1. A measuring device 34, mounted upon frame member 26 adjacent the position of hole 30 in the drawing determines the size or the other characteristic of each of the objects, according to which they are being classified or sorted. When the object reaches the position of hole 31, it is positioned above a hole (not shown) in frame member 26 through which it drops into one of six hollow receptacles or cups 36 which are equally spaced around the edge of a second rotary disk or turret plate 40.

The gear mechanism which connects shaft 22 with drive shaft 24 is such that each of the periodic or step-by-step rotations of shaft 14 causes shaft 22 of plate 24 to rotate 90 degrees. Furthermore, during periods of rest or pauses between those of rotation, the holes in plates 24 assume the positions shown in the drawing, so that an object received through tube 32 moves around the edge of plate 24, halting first at the position of hole 29, then at that of tube 30 in front of measuring device 34, and finally at that of hole 31, at which position it drops into one of receptacles 36.

Turret plate 40 is rigidly mounted upon a shaft 42, which is rotated by shaft 14 through a gear assembly 44 in such a way that turret plate 40 is rotated through an angle of 60 degrees during each period of step-by-step rotation of shaft 14. During each of the pauses between such rotation, one of the receptacles 36 is located beneath the position of the hole in disk 24 at the position of hole 31 in FIGURE 1. At such times, each of the other receptacles is located above one of five chutes 46, each of which leads to one of five hoppers 48. Each object enters one of receptacles 36, and it is moved counterclockwise with turret plate 40, stopping momentarily at each of the chutes 46 and hoppers 48 until it reaches the one assigned to it in accordance with the sorting or classifying process. At this point, a control device hereinafter to be described, releases it from its receptacle, causing it to slide down its chute 46 into the appropriate hopper 48. Since each of the objects being sorted or classified belongs in one of the five hoppers, each of receptacles returns to the loading position empty, so that it can receive another object.

In the illustrtaive embodiment of FIGURES 1 to 3, the five chutes 46 and their hoppers 48 represent discharge Stations I, II, III, IV and V, respectively, and the Station in FIGURE 1 at hole 31 in disk 24 is referred to as the receiving Station O. The mechanism for performing the distribution of the objects to the proper stations, and for controlling that distribution, is a rotary turret 39 which is mounted upon shaft 42 to turn therewith. The upper portion of turret 39 performs the distribution of the objects, and includes the receptacles 36, the turret plate 40, and also a similar plate 52 positioned beneath plate 4 in parallel spaced relationship thereto. Each of the receptacles 36 is formed by a cylindrical side wall 37 integral with plate 40, and a bottom wall formed by a shutter 58 swingably mounted between plates 40 and 52.

As shown at Station II in FIGURE 3, an object 50 positioned in a receptacle 36 rests upon the shutter 58 when the shutter is in the closed-receptacle position. Plate 50 has an opening 51 (see Station V) beneath each of the receptacles 36 with the periphery of each of the openings in alignment with the inner surface of the cylindrical wall 37. Hence, when any one of the shutters 58 is swung from its closed-receptacle position, an object 50 within that receptacle drops through the opening 51.

Each of the shutters 58 is rigidly mounted upon the upper end of a shaft 54, which is journaled at the top in plate 52 and also in a ring 56 which is also part of the turret. Each of the shafts 54 is part of a discharge control unit or memory device 59 which controls the operation of its shutter 58 and which is the memory device for its receptacle 36. As will be explained more fully below, simultaneously with the depositing of each object 50 into one of the receptacles 36, the memory device 59 for that receptacle is adjusted or set in accordance with the characteristics of that particular object to cause that object to be discharged at one of the Stations I to V in accordance with the classification.

Each shaft 54 carries a toothed rack 60 which has teeth 61 and is a body of revolution and is tubular with the belt being annular. Rack 60 is longitudinally slidable on the said shaft 54 but is keyed to the shaft for rotation therewith. A finger 62 is rigidly fixed on a tubular bottom extension of the rack 60, so as to move therewith, both for rotation and sliding movement. The shaft 54 is extended through the ring 56 and its lower extremity carries a finger 64, which is rigidly fixed to the shaft. Each shaft 54 with its shutter 4, tubular rack 8 and fingers 62 and 64 constitutes a mechanical memory device or unit according to the invention. The whole of the assembly described above forms a rotary turret which is driven in the manner previously described so that it rotates forwardly counterclockwise by one step at a time a distance corresponding to that between each station and the next.

At the input or receiving Station O there is provided a toothed wheel or pinion 66 rotatably mounted on a fixed pivot with respect to the rotary turret 39 on vertical frame member 72. Pinion 66 is adapted for rotation by a manual drive formed by a ratchet device 68 and an operating arm 70 which may be swung through an arc between positions O and V. The teeth 67 of toothed wheel 66 are adapted to engage those of the adjacent rack 60 and to slide the rack upwards along shaft 56. Wheel 66 is a "setting" or registration point which is used to position each of the racks 60 to correspond with classification of the object placed in its receptacle.

In the central part of the rotary turret is mounted a fixed cylindrical member or ramp plate 74 having a helicoidal threaded outer face with teeth overlapping ramps 81. Ramp plate 74 is mounted in a fixed position upon a stationary core frame 76, which is fixed to base 4. Core frame is a hollow cylinder, surrounding shaft 42 and extending upwardly through ring 56 in such a manner that it does not interfere with the free rotation of the turret. The teeth on the racks 60 are adapted to engage with the teeth on the face of the ramp 74 at every position of the device, except at the input station where there is a semi-circular clearance notch or slot 79 facing the input or receiving Station O. This permits the toothed racks to slide freely upwardly at this station, under the action of the registration pinion 66. The pitch of the thread on the face of the ramp 74 is such that each rack 60 moves downwardly the height of one rack tooth for each forward step movement of the turret. Hence, if a rack 60 is elevated the height of one tooth at Station O, it will move back down to its 0 position when it moves between Stations O and I. Similarly, if the rack is raised the height of N teeth (from 2 to 5) at Station O, the rack will return to its 0 position at Station N.

Therefore, each of the memory devices 59 is adapted to receive a setting or classification number corresponding to that of an object which is deposited in its receptacle. The memory device then moves simultaneously with the movement of the object and it reaches its 0 position when the object has reached the Station N corresponding to its classification. In accordance with the present invention, mechanical memory devices of this character are used to record the classification or characteristics of the various objects and to control their distribution. In the embodiment of FIGURES 1 and 3, each object is discharged from its receptacle by a mechanical action which is produced directly as a result of the return of the movable rack to its 0 position.

Surrounding ring 56 and adjacent its outer edge is a stationary outer ring 78, which is mounted upon frame members 72 and 82 and which carries five upright posts or studs 80. A stationary ring 84 is mounted at the lower ends of shaft 54, and carries a post 85 located between Stations V and O. Posts 80 corresponds respectively to Stations I to V, and each of them is positioned substantially in alignment with the center of its chute 46. Posts 80 are also positioned in the path of fingers 62 when these fingers are positioned as they are when racks 60 are in their 0 positions and when the shutters 58 are in the closed-receptacle positions. Hence, when one of the racks 60 moves past a post 80 while in its 0 position, its finger 62 engages that post and the continued movement of the rack causes the finger to swing the rack and the shaft 54 and the shutter 58 from the position at Station IV to the position at Station V. That opens the bottom of the receptacle and discharges the object into that chute. However, when the rack is elevated from its 0 position as at Stations III and IV, its finger 62 passes above the posts 80 so that the rack and shaft are not turned and the shutter remain in the closed-receptacle position. Therefore, each of the memory devices 59 is ineffective to discharge the object in its receptacle until rack 60 has returned to its 0 position, but when the rack is in its 0 position, finger 62 then engages the next post 80 and its object is discharged.

As each of the memory devices moves from Station V to Station O its finger 64 engages post 86 so as to swing its shaft and shutter 58 from their positions of Station V to those of Station O. Hence, at Station O memory device has been returned to its "home position" i.e., the initial position from which it is moved to cause it to perform its control and discharge functions for the next object deposited in its receptacle. The final movement of each of the racks 60 from Station V to Station O positions the top teeth on the rack into engaging relationship with teeth on pinion 66. Arm 70 is then swung through the proper angle to transmit the proper setting to the rack.

The operation of the device is as follows:

Each object 50 which is distributed is fed into the receptacle 36 which is at that moment at Station O, the bottom of the receptacle being closed by the shutter 58. The associated toothed rack 60 has also reached Station O and its teeth have engaged with the teeth of the registration pinion 66. The classification number or order-value of that component 50 is then registered swinging arm 70 from 0 to the corresponding number, and that turns pinion 66 through an angle corresponding to that number N of the teeth of the pinion. Rotation of the pinion 66 through an arc of N teeth causes an upward sliding movement of the engaged rack 60 to a height corresponding to the height of N teeth on the rack.

Immediately thereafter, the turret is advanced by one step counterclockwise in order to prepare for the next registration to follow. During this step, the object or component and the rack which is associated with it are moved from Station O to Station I, and after leaving Station O, the interengaged teeth of the rack 60 and the ramp plate 74 cause the step movement of the turret to move the rack downwardly the height of one tooth.

Thus, the rack which has been raised for example by five teeth at Station O will have a height of four teeth at Station I, three teeth at Station II, two teeth at Station III and one tooth at Station IV, reaching is bottom or 0 position at Station V. The finger 62 on the rack which has been registered with the classification number 5, passes over the studs 80 of Stations I to IV, but at Station V, the rack has moved down to its bottom or 0 position, through a height of five teeth, and its finger 62 comes into contact with the studs 80 at the Station V. This cause rotation of its shaft 54 together with the shutter 58 so as to open the bottom of the receptacle 36, and the rack is now disengaged from the threaded ramp plate 74. During the next step movement, the finger 64 engages post 86 and swings its shaft 54 and rack 60 back to the "home position," thus to complete the cycle.

It is thus seen that the turret performs the dual function of conveying the objects from the inlet or receiving station past the various discharge or delivery stations in a particular sequence; and, the turret also controls the discharging of each of the objects at the proper station. Hence, the receptacles may be considered collectively as a conveyor, and each of the assemblies formed by a shaft 54 and its rack 60 is a control device or unit which is set or adjusted by pinion 66 and is then operated by passage along the ramp plate 74 and past the posts 80 and posts 86. The term "memory device" has been used herein and elsewhere in the sense of defining a control unit of the type herein disclosed wherein the device or unit is given a specific setting and then retains or "remembers" the setting until a predetermined control function has been performed.

It should be noted that the embodiment of FIGURES 1 to 3 is so arranged that the turret has a vertical axis so that gravity can be relied upon to bias the racks 60 downwardly to the 0 or home position. However, the gravity bias is not necessary for proper operation because of the overlapping relationship between the ramps 81 on the ramp plate. That is, when one of the teeth 61 is in alignment with and moves into one of the ramps 81 there is always another tooth 61 in one of the next adjacent ramps. Hence, the returning of each of the racks to its 0 or home position is a positive action of the ramp plate and need not involve the action of gravity. This positive movement is insured by the provision of six teeth 61 on each of the racks. The racks are lifted a maximum of the height of five teeth so that their two teeth always move into ramps as the rack moves away from Station O.

Figure 4:
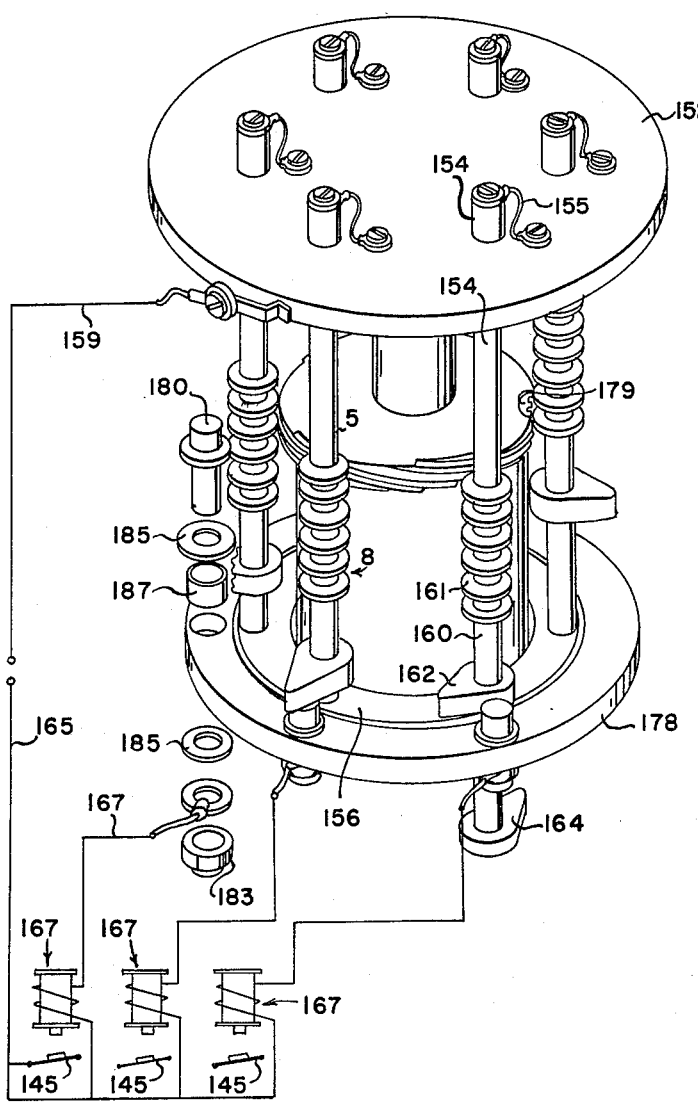
FIGURE 4 is a view similar to FIGURE 3 of another embodiment of the invention.

FIGURE 4 is a somewhat schematic representation of an arrangement for utilizing the turret and memory device or control unit assembly of FIGURES 1 to 4 with an electrical control system. With this arrangement the objects are discharged by the action of electrical relays after each has been conveyed along a predetermined path simultaneously with the movement of the turret. The objects may be moved continuously while the turret is given a step-by-step movement. In FIGURE 4 the elements or parts bear numbers 100 greater than the numbers for the corresponding elements in FIGURES 1 to 3. Accordingly, a plate 152 and a ring 156 provide a journal mounting for shafts 154 and each of the shafts 154 has slidably keyed to it a rack 160 having six teeth 161 and a finger 162. Each of the shafts 154 also has a finger 164. An electrical connection is provided between the top of each shaft 154 and plate 152 by a flexible wire or pigtail 155 clamped at its ends to the shaft and the plate. At the periphery of plate 152 there is a stationary electrical contactor 157 which is connected through a wire 159 to one side of a source of electricity, indicated at 163. The other side of the source of electricity is connected through a line 165 to one side of the solenoid of each of five relays 167, only three of which are shown. The other side of each of the relays is connected through a line 167 to an electrical contact post 180 which is mounted upon a stationary ring 178. Each of the post is threaded and has a nut 183 clamping it in place and it is insulated from ring 178 by two insulation washers 185 and an insulation sleeve 187.

Posts 180 are positioned around ring 178 in a manner corresponding to the positions of posts 80 in FIGURE 3. Hence, when one of the racks 160 has been elevated the height of a certain number of its teeth, lit then moved downwardly so that its finger 162 contacts the post 180 in accordance with the same procedure as when a finger 62 in FIGURE 3 engages a post 80 and swings its shutter 158 to discharge the object in its receptacle. Each of the relays 167 has an armature 145 which is lifted by the energization of its solenoid to complete an electrical circuit and discharge a selected object from the conveying system (not shown). With this arrangement, the conveying system is separated from the control system and may be constructed to handle heavy and bulky items, or items which are positioned and moved at remote or inaccessible places.

Figure 5:
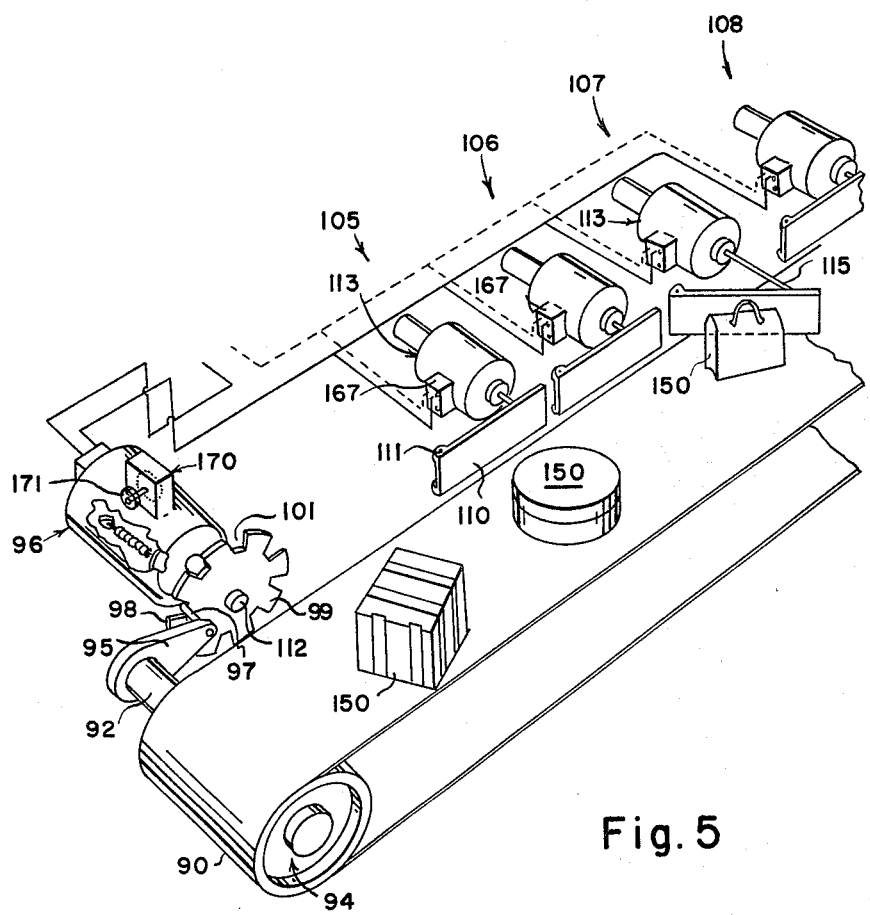
FIGURE 5 is a perspective view, with parts broken away of an application of the embodiment of the invention shown in FIGURE 4; and, FIGURE 6 illustrates another embodiment of the invention, in which the memory transfer device is of elongated form instead of being circular.

The system of FIGURE 5 is illustrative of the type of system which may include the control arrangement of FIGURE 4. In FIGURE 5, a conveyor 90 has a conveyor belt 91 mounted at the near end upon a roll 94 having shaft 92, and is driven at its remote end through a roll (not shown). Packages 150 of various types and shapes are positioned upon the upper run of the belt at roll 94 and are moved continuously at a predetermined rate toward the remote end of the belt. Shaft 92 carries the arm 95 of a Maltese-cross drive 98 having a drive disk 99 mounted upon the shaft 112 of the turret of an electrical control unit 96 of the type of FIGURE 4.

Arm 95 has a pin 97 which moves into one of the slots 101 in the periphery of disk 99 during each revolution of roll 94 and thereby rotates disk 99 an amount which is the space between the slots 101. Hence, shaft 112 transmits a step-by-step movement to the turret of unit 96 in the same manner as shaft 12 transmits step-by-step movement to the turret 39 in FIGURES 1 to 3. A manual setting unit 170 has a pinion with a calibrated knob 171 which is turned to control the positioning or setting of the racks 161 (FIGURE 4) when at the Station O. Hence, when a package 150 is placed onto belt 91 at roll 94 the operator determines its destination or point of discharge and manually sets the rack which is then at Station O of the control unit 96.

Positioned along the path of the objects of the upper run of belt 91 is a series of electrically operated discharge units numbered 105 to 108. Each of these units has a hinged discharge plate 110 which is pivoted at 111 and is adapted to be swung outwardly (as illustrated by unit 107) into the path of objects on the belt. This swinging movement is performed by an electrical operated unit 113 which has a plunger 115 connected to the plate 110. Mounted upon the side of each of the units 113 is the appropriate relay 167 (see also FIGURE 4). Hence, when a package or object 150 on belt 91 reaches the selected point of discharge, its relay 167 is closed as explained above and the appoprriate plate 110 is swung outwardly so as to divert the package or object off the opposite side of belt 91.

It has been pointed out above that the rack and ramp plate arrangement of FIGURES 1 to 3 does not depend upon the action of gravity in that each of the racks is moved with a positive action from its set position back to its 0 or home position. Hence, in FIGURE 5 the control unit 96 is positioned with a horizontal axis, although for convenience, it may be turned to a vertical axis by the use of gears.

Figure 6:
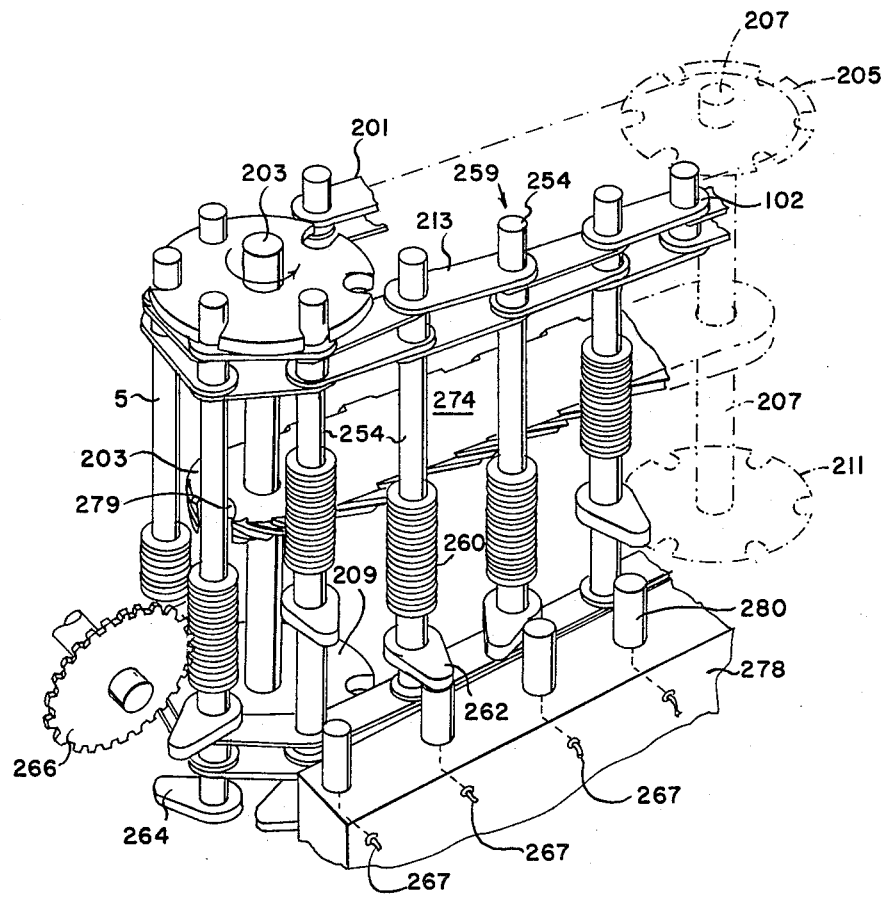

FIGURE 6 illustrates another arrangement wherein memory units are control devices of the general type of FIGURES 1 to 5 are mounted upon an endless chain arrangement. This permits a material increase in the number of classifications to which the objects may be assigned without the necessity for materially increasing the dimensions of the entire control system. In FIGURE 6 the elements are numbered 200 greater than the corresponding elements of FIGURES 1 to 3. An upper endless chain 201 is mounted upon a pair of slotted disks 203 and 205 and a similar bottom endless chain 207 is mounted upon similar slotted disks 209 and 211. Slotted disks 203 and 209 are mounted upon and keyed to a drive shaft 203, and slotted disks 205 and 211 are mounted upon and keyed to a shaft 203.

Each of the endless chains 201 and 207 is formed by an assembly of links 213 which are in pairs and are interconnected by the respective ends of the shafts 254.

It will of course be understood that the embodiments of the invention described above have only been selected by way of example and without any implied limitation. Other alternative forms of construction may be adapted, without thereby departing from the scope of the invention as defined by the appended claims.

I claim:
1. In a selective system for delivering individual items to selected stations, the combination of, means constituting a series of delivery stations to which the items are to be delivered, said delivery stations being positioned along a delivery path extending from a home station, means to receive the individual items at said home station and to move each of them to a selected one of said delivery stations, a plurality of control units, means to move said control units along a control path which corresponds to said delivery path and has a plurality of delivery-control stations corresponding in number to said delivery stations and also having a selecting station corresponding to said home station, each of said control units having a movable toothed member with a plurality of teeth of predetermined pitch and mounting means for its toothed member which mounts said toothed member so that it may be moved from a home position to a selected position which is spaced from said home position an amount corresponding to N times the pitch of the teeth on said toothed member wherein N is a number corresponding to a selected delivery control station, and a cam member positioned along said control path and having a plurality of tooth-cams each of which extends along said control path, said toothcams being spaced apart along said control path substantially the distance between said control stations and being in engaging relationship with said teeth when said toothed member is moved from its home position, each of said tooth-cams extending a distance parallel to the movement of said toothed member to and from its home position a distance equal to the pitch of said teeth, whereby said toothed member may be moved from its home position to a position said N times said pitch away from said home position and may then be moved along said control path and during such movement will be moved toward its home position by each of said tooth-cams an amount equal to said pitch, each of said control units having delivery control means which initiates the delivery of an item at the selected station upon the completion of the movement of the toothed member to its home position.

2. A system as described in claim 1 wherein said delivery control means for each of said control units comprises abutment means upon the toothed member and cooperating means which is fixed with respect thereto and is engaged by the abutment means when the toothed member is in its home position and moves past one of said delivery control stations.

3. A system as described in claim 2 wherein said cooperating means comprises a plurality of stationary posts positioned respectively at said delivery control stations.

4. A system as described in claim 2 wherein each of said control units includes a shaft which constitutes the mounting means for the toothed member and upon which said toothed member is slidably mounted, and wherein the engagement between said abutment means and said cooperating means acts to turn said toothed member about the axis of said shaft to thereby initiate the delivery of the item at the selected station.

5. A system as described in claim 4 which includes a second abutment means upon each of said toothed members and means along said control path which is engaged by said second abutment means to return each of the toothed members to its home position prior to arrival at said selecting station.

6. A system as described in claim 5 wherein said means to receive the individual items constitutes a plurality of receptacles corresponding in number to said control units and associated respectively therewith, and delivery means which is operated by the turning movements of said toothed members to discharge the items respectively at said delivery stations.

7. A system as described in claim 6 which includes a top plate and wherein said receptacles are formed by walls positioned respectively in an annular zone around said top plate and a plurality of shutters forming the bottom walls of said receptacles, and wherein the turning movement of the respective toothed members moves the respective shutters to thereby discharge the items.

8. A system as described in claim 7 wherein each of said toothed member is keyed to and slidable upon its shaft and each of said shutters is rigidly mounted upon the respective one of said shafts.

9. A system as described in claim 5 which includes electrical circuit means forming an electrical circuit for each of said delivery stations with each electrical circuit including switch means which is closed by the engagement of said abutment means with the respective cooperating means.

10. A system as described in claim 9 wherein said means to receive the individual items is a conveyor upon which the items are deposited and along which they are carried past the respective delivery stations and which includes means under the control of the respective electrical circuits and positioned at the delivery stations to discharge the items from said conveyor.

11. A system as described in claim 10 which includes a Maltese-cross drive from said conveyor to said means to move said control units to impart a step-by-step movement thereto.

12. A system as described in claim 5 wherein said means to move said control units comprises a turret and said cam member comprises a circular plate having a notch therein positioned for the free movement of said toothed members at said selecting station.

13. A system as described in claim 12 which includes a synchronous drive unit to simultaneously impart step-by-step movement to said turret and to deliver items to said means to receive them.

14. A system as described in claim 1 wherein said means to move said control units comprises an endless chain assembly and mounting means therefor and having spaced parallel runs, and wherein said cam member is an elongated plate positioned between said runs.

15. In a selective delivery system for delivering articles to selected delivery stations, the combination of: a plurality of control units each of which comprises a toothed member having a home position and means mounting said toothed member for movement in the direction of the pitch of its teeth whereby said toothed member may be moved to a set position which is spaced from said home position N times the pitch of said teeth wherein N is a selected number identifying one receiving station which is of a series and to which an article is to be delivered; means mounting each of said control units for movement from a setting position past a series of control positions corresponding respectively to said receiving stations to which the articles are to be delivered in accordance with the respective settings of said control units; and means which acts upon each of said toothed members when it is not in its home position during movement thereof to each of said control stations to move said toothed member the pitch of one tooth in the direction from its set position toward its home position.

16. A system as described in claim 15 which includes means to move said control units to and from said control stations with a step-by-step movement, and a pinion to set one of said toothed members between each step movement and the next.

17. A system as described in claim 15 wherein each of said toothed members is a tubular rack having annular teeth and a radial finger which engages fixed means to turn said rack when in its home position, and wherein the system includes a plurality of receptacles corresponding in number to said control units and mounted respectively for movement therewith, each of said receptacles being formed by a side wall portion and a bottom formed by shutter means, and wherein said shutter means is moved to open the bottom of its receptacle by the above-mentioned turning movement of an associated rack.

18. In a system for delivering objects to delivery stations in accordance with their characteristics, control means comprising, a rotary turret, a plurality of control units mounted upon said turret and adapted to move around a circular path from a setting position successively past a series of control positions, each of said control units comprising a toothed rack and means mounting said toothed member for sliding movement at said setting position from a home position to a position which is N times the pitch of the teeth where N is a number between 1 and the number of said control stations, stationary ramp means presenting cam ramps along said circular path and engaging the teeth of each of said toothed members when out of its home position and moved there along with each toothed member being moved thereby toward its home position a distance equal to the pitch of its teeth.

19. A moving mechanical classifying device of the kind intended for classifying objects in accordance with their respective characteristics, said device comprising a movable indexing device and a plurality of control units mounted on said movable device, each of said control units having a shaft and a toothed member mounted thereon and possessing two degrees of freedom of movement, namely: a longitudinally slidable movement of said toothed member which is adapted to permit the registration of value; and means providing rotational movement of said shaft and enabling the object to be distributed as predetermined by said value.

References Cited by the Examiner
UNITED STATES PATENTS

| | | | |
|---|---|---|---|
| 2,518,037 | 8/1950 | Mackechnie | 214—11 |
| 3,049,246 | 8/1962 | Bishop | 214—11 |
| 3,086,636 | 4/1963 | Raynor | 214—11 X |

MARVIN A. CHAMPION, *Primary Examiner.*